United States Patent [19]

May

[11] E Re. 29,630

[45] Reissued May 16, 1978

[54] FIRE RESISTANT FABRICS

[75] Inventor: Robert Edward May, Pleasant Garden, N.C.

[73] Assignee: Burlington Industries, Inc., Greensboro, N.C.

[21] Appl. No.: 724,369

[22] Filed: Sep. 17, 1976

Related U.S. Patent Documents

Reissue of:

[64] Patent No.: 3,934,285
Issued: Jan. 27, 1976
Appl. No.: 172,212
Filed: Aug. 16, 1971

[51] Int. Cl.[2] ..... A47C 27/12; B05D 3/12

[52] U.S. Cl. ..... 5/345 R; 5/354; 297/DIG. 5; 427/357; 427/358; 427/390 D; 427/392; 428/921

[58] Field of Search ..... 5/345 R, 354; 297/DIG. 5;427/357, 358, 390 D, 392; 428/421

[56] References Cited

U.S. PATENT DOCUMENTS

| | | | |
|---|---|---|---|
| 2,610,338 | 9/1952 | Taylor | 5/361 |
| 2,630,573 | 3/1953 | Rand | 428/242 |
| 2,630,620 | 3/1953 | Rand | 428/242 |
| 2,703,768 | 3/1955 | Hall | 156/368 |
| 2,743,192 | 4/1956 | White | 427/379 |
| 2,767,104 | 10/1956 | Avery | 428/263 |
| 3,489,714 | 1/1970 | Sayles | 428/921 |
| 3,496,057 | 2/1970 | McCluer | 252/556 |
| 3,497,469 | 2/1970 | Blair | 428/425 |
| 3,591,400 | 7/1971 | Palmquist et al. | 428/920 |
| 3,653,942 | 4/1972 | Boebel et al. | 428/429 |
| 3,813,715 | 6/1974 | Sookne | 5/345 R |
| 3,818,521 | 6/1974 | Richards | 5/345 R |

*Primary Examiner*—Harry J. Gwinnell
*Attorney, Agent, or Firm*—Cushman, Darby & Cushman

[57] ABSTRACT

Mattress *and upholstery* fabrics or the like rendered fire-resistant by coating the underside with a polymeric binder having dispersed therein from 30–60% by weight of a flake- or leaf-shaped heat conductive material selected from the group consisting of aluminum and graphite of from 50–400 mesh.

14 Claims, No Drawings

FIRE RESISTANT FABRICS

Matter enclosed in heavy brackets [ ] appears in the original patent but forms no part of this reissue specification; matter printed in italics indicates the additions made by reissue.

The present invention is concerned with the provision of fire-resistant fabric. A particularly important application of the invention is in the provision of mattress fabrics notably ticking, pads and covers, that prevent ignition or charring of the mattress batting by a lighted cigarette or the like falling on the mattress.

It is well known that many fatal and/or otherwise disastrous fires result from smoking in bed, usually because the smoker falls asleep and his lighted cigarette drops onto the bedding. Unlike flash fires associated with inflammable clothing, a mattress fire is normally a slow-developing catastrophe which may involve asphyxiation of the smoker by fumes, smoke damage and/or total loss by fire of the building involved. The problem is a very serious one and numerous efforts have been made to come up with effective flame-retardant mattress ticking or the like. Thus, for example, it has been proposed that the ticking be made either by application of various standard flameproofing chemicals to cotton or other ticking fabrics, or by using fibers of inherently flame-resistant polymers such as polyvinyl chloride. However, the objective of such conventional flameproofed ticking fabrics is generally to prevent ignition of the mattress during relatively short periods of exposure to open flame. In fact, essentially all flameproofed fabrics, e.g. clothing, bedclothes, bedding, protective uniforms, and the like, are designed for short exposures to open flame, the presumption being that the victim, given sufficient protection from a flash fire, will be able to move away from the source of flame in time to save himself.

However, the cigarette falling from the mouth of a sleeper onto the mattress beneath him poses an entirely different problem to those dealt with in conventional [flameretardant] *flame-retardant* fabrics. Thus, in the usual case of a fire resulting from smoking in bed, there is long exposure of the fabric to the source of fire, the victim is asleep and there is a large concentrated source of combustibles exposed in the batting once the cigarette burns through the bed sheet, possibly a blanket, and the mattress ticking. Neither sheets nor blankets are thought to be significant sources of real danger on most such occasions, presumably because they are horizontal and thin, and consequently usually burn only nonspreading holes. It is in the smoldering, fumeproducing, and eventually catastrophically flaming mattress batting, however, that the prime hazard most frequently lies.

The principal object of the present invention is to provide mattress fabric or the like which is resistant to burning by lighted cigarettes. Other objects will also be hereinafter apparent.

Broadly stated, the objects of the invention are realized by applying to the inner or underside of mattress fabric, e.g., ticking, pads or covers, or the like, a coating comprising a flexible, film-forming polymeric or resinous binder and from 30–60% by weight, preferably about 45%, of a heat-conductive flake- or leaf-shaped material, finely divided leafing-grade aluminum or conductive graphite being preferred.

The coating used herein must have sufficient conductive capacity to carry away the heat of the cigarette fast enough to prevent charring of the batting. This capacity appears to be primarily a function of three things: the composition, quantity, and shape of the conductive filler. The nature of the binder does not seem to be critical provided it is inexpensive, odorless, sewable, film-forming and sufficiently flexible to avoid cracking or crackling in use. It is important, too, that the binder retain its flexibility through the life of the mattress.

The use of heat-absorbing or heat-dissipating metal has previously been disclosed for use in otherwise fundamentally different environments and/or for different purposes (see for example, U.S. Pat. No. 3,445,320 which describes underlaying the face layer of vinyl tile flooring with a layer formed of heat-absorbing metal to protect the tile from damage from cigarette butts). However, it is highly unexpected that application of a coating as described herein could be effectively used to prepare cigarette resistant mattress fabrics. This is emphasized by the fact that conventional means for insulating materials or for rendering the same flame retardant are not satisfactory for present purposes. For example, insulating layers of known noncombustible materials, such as glass fibers, when used in a sufficiently thick form to protect the batting from the heat of the cigarette, are excessively bulky and expensive. Coatings or layers of flame-retardant foams made from polymers such as polyvinyl chloride, and expected to smother a burning cigarette, melt and permit the cigarette to fall into the batting while still glowing. Certain intumescent coatings, although reasonably effective in protecting the mattress batting by developing an insulative layer of char between batting and cigarette, are undesirably tacky, grainy, and difficult to apply. Additionally, films and fabrics which have been metallized, for example, by vacuum sublimation of aluminum, to give the highly heat-reflective thin coatings well known in the art, and laminated to the ticking before or after metallizing, are ineffective in protecting the batting, presumably because they are too thin to carry the heat of the cigarette away fast enough. The present invention, in contrast, provides an effective way of protecting the batting from fire while at the same time being free from the further problems noted with other possible insulating alternatives.

The success of the invention appears to be due, at least to an important extent, to the shape, size and amount of the filler utilized. More particularly, the filler should be in leaf or flake form as noted above, i.e., granular and like filler shapes should not be employed for most effective results. Laterally, however, the shape of the flake or leaf may be random in nature.

It has also been found that the size of the filler should be in the range of about 50–400 mesh (U.S. Sieve). The optimum mesh size for any particular situation is dependent on such factors as the binder, proportion of filler used, thickness of the coating, other properties desired, e.g., degree of flexibility of the coating, etc. It appears, for example, that coarser filler sizes within the range indicated give the best results from the standpoint of heat removal but this must be balanced off with such items as flexibility and ease of application, finer sizes being preferred in the latter respects. As noted earlier herein, the amount of filler in the coating should be in the range of 30–60%, preferably about 45%, based on the weight of the coating (dried). The weight of the applied coating can be rather widely varied although usually the desired weight will be in the range of 3–5 ounces per square yard of fabric at filler concentrations of about 45%. However, coating weights outside this range, e.g., 2–7 ounces or more per square yard, can also be effectively used.

Preferably the coating is applied by knife coating although other modes of application, e.g., spraying, padding or the like, may also be used.

The coating composition as applied should be sufficiently viscous to avoid strikethrough of the composition to the front or face of the fabric. To this end, the composition is usually a relatively viscous suspension of the filler and binder containing from 40–50% by weight water or volatile organic liquid carrier. Conventional thickeners, stabilizers and/or plasticizers may also be included in the composition to increase the viscosity or stability of the composition [to increase the viscosity or stability of the composition] and flexibility of the resulting coating. The nature and amount of such additives, if used, can be widely varied and the ultimate selection, for optimum results, will depend on other factors; e.g., whether or not a plasticizer is used depends, at least to some extent, on the nature of the polymer binder and its flexibility. Those in the art can readily determine whether or not the indicated additives need be used dependent on other operating conditions.

As noted, the filler is preferably flake or leafing aluminum or conductive graphite. A useful form of leaf aluminum is available as grades MD 2100, MD 5100 and MD 7100 (Alcan Metal Powders Division, Alcan Aluminum Corp. Elizabeth, N.J.). These grades pass 99.8% through 100-mesh, 99.0% through 325-mesh, and 98% through 400-mesh screens, respectively. The coarsest grade, MD 2100, appears to give the best results although all three grades are effective for present purposes. Other available types of leaf or flake aluminum may also be utilized. Particularly, good results have been obtained using about 100-mesh aluminum flake as the conductive filler with a vinyl binder to give coatings which, when dried, weigh around 2 to 7, preferably 3.5 ounces per square yard of fabric, and contain about 45% by weight of aluminum based on the dry coating. Obviously, however, other mesh sizes, amounts of aluminum and binder may be effectively used within the framework of this disclosure.

In the case of graphite, it is essential that this be conductive if it is to function effectively as the filler herein. Apparently all graphite is fundamentally flakelike in structure, but not all graphite is conductive. Amorphous graphite does not appear to be conductive and, therefore, should not be used for present purposes. A representative example of a suitable conductive graphite is Madagascar flake graphite available as No. 3 graphite (Asbury Graphite Mills, Inc.). Particularly useful results have been obtained using this graphite in a vinyl binder on mattress ticking to give coatings which, when dried, weigh around 4–4.5 ounces per square yard of fabric.

Mixtures of flake graphite and aluminum may be used if desired although it is usually more convenient to use one or the other alone depending on the effect desired. In this connection, it is noted that whereas aluminum lays down a bright silvery backing on mattress ticking or the like, graphite gives a pleasing dark gray coating, both fillers being resistant to rubbing off when applied as described herein.

It is also possible that other conductive metals in leaf or flake form may be used herein as the fillers. Silver and gold may be mentioned as possibilities although these are generally too expensive to find any wide application.

A wide variety of polymeric resins may be used herein as the binder. This component does not seem to affect the thermal conductivity of the coating but it should be selected to give a coating which is flexible, breathable or porous, durable, elastic, odorless and otherwise free from properties which would be undesirable for the intended use of the coated fabric. Advantageously, the binder is a film-forming addition polymer of one or more ethylenically unsaturated monomers, e.g., a vinyl or acrylic polymer, the preferred binder being Geon 576, an ester-plasticized aqueous dispersion of a polyvinyl chloride copolymer (Goodrich). Exon 790, a medium molecular weight polyvinyl chloride homopolymer latex (Firestone), has an advantage from the cost standpoint but presents some difficulties in the preparation of stable suspensions containing the conductive filler. Other useful binders include a commercially available 55% aqueous dispersion of a copolymer of about 17% ethylene and 83% vinyl acetate, protected by a polyvinyl alcohol protective colloid and Rhoplex HA-8, a self-cross-linking acrylic emulsion. Flexible polyurethanes or other polymeric binders may also be used.

The coating composition used herein is preferably in the form of an aqueous suspension or emulsion since this, generally speaking, gives greater breathability and lower cost. However, organosols or like suspensions of the binder and filler in an inert organic liquid vehicle may also be used.

Preparation of the coating composition, in most cases, involves only a straightforward controlled mixing or stirring together of the binder, filler and vehicle, to obtain the desired suspension. In other situations, however, for example, in the case of Exon 790, there may be a need for special precautions, such as avoiding excessively vigorous stirring, or blending of the individual components with a surfactant before mixing the components together, in order to obtain a stable suspension (or emulsion) which holds together and does not separate out. Apparently the unswellable flakes of metal or graphite filler can put a fairly heavy strain on the stability of the suspension and care should be taken, in formulating the coating, to maintain the best possible stability.

The invention is applicable to any type of mattress fabric construction whether of plain or special construction. The fabric, e.g, mattress ticking, may also include other conventional treating agents, such as a flame retardant, if this is desired. The heat removal from the locus of a cigarette appears to be so substantial that burning spreads very little regardless of the composition of the fabric itself. Ticking processed according to the invention may be used to make mattresses of any desired and well-known construction, it being sufficient for present purposes to describe such mattresses as comprising an encasing ticking fabric filled with batting. The batting may be rayon or other natural or synthetic material while the ticking is usually woven cotton fabric although other different types of fabrics may be similarly processed.

After the coating composition is applied to the underside of the fabric in the manner described above, the treated fabric should be dried in any convenient fashion, e.g., by hot air or by passage over heat rolls, to dry the coating. Times and temperatures for drying can be widely varied depending on various factors, e.g., the vehicle used, the nature of the fabric, amount of coating composition applied, etc. However, usually the drying conditions will be in the range of 200°-350° F for 1-15 minutes although it will be appreciated that other conditions may also be effectively used.

In formulating the coating compositions used herein, it will be appreciated that the filler, particularly in finer sizes, must be handled carefully to minimize explosion hazards. There is an additional problem in the handling of aluminum and that is its tendency to react and liberate hydrogen under certain conditions when dispersed in an aqueous medium. Such reaction does not take place if the pH of the system is held between 7 and 8.5, preferably at about 8. The preferred aqueous formulas described herein have a storage life of at least a week when held at the recommended pH and some mixes can be stored for several months with no noticeable change in performance. Nevertheless it is preferable, as a safeguard, to store any large quantities of aqueous aluminum binder mix in a vented container in a well ventilated room even if the pH is left within the 7 to 8.5 range mentioned above. Aqueous graphite suspensions do not require this sort of special treatment because of their inertness. In certain circumstances, graphite is preferred for use over aluminum even though the thermal conductivity of the latter is about one-third greater than that of graphite.

The fire resistance of fabric treated according to the invention has been determined by the "cigarette test." This consists of placing a burning regular size cigarette on a sample of back-coated mattress fabric and allowing the cigarette to burn out completely. To simulate mattress batting the treated fabric was backed with 5 oz-/yd$^2$ rayon batt composed of 3-inch, 2-denier fibers. Samples were evaluated by examining the amount of char on the batt after the cigarette had burned out. If the batt was only slightly charred it was ruled acceptable. A large amount of char meant the sample failed the test. Test samples used herein were at least 5 inches × 5 inches. The test is similar to Canadian Department of Defense test "Combustion Resistance of Mattresses: Cigarette Test", 35-GP-1, July 19, 1968.

The invention is illustrated, but not limited, by the following examples:

EXAMPLE 1

Into a mixture of 50g tricresyl phosphate and 20g Triton X-100 was gradually stirred, with a Lightnin' mixer 109g of 100-mesh leafing-grade aluminum (Alcan MD 2100). When the mixture became too thick, a small portion from a total of 194g of Geon 460X1 latex was added as a thinner, the rest of the latex being stirred in as soon as the addition of aluminum was complete. After this, 30g of Alcogum AN-10 thickener was added, and the mixture was stirred at high speed until very smooth. Two other batches of coating mixture were made in the same way, but using 325-mesh Alcan MD 5100 and 400-mesh Alcan MD 7100 flake instead of the MD 2100.

The three formulations were knife-coated onto conventional cotton mattress ticking at a 50-mil knife setting and dried in a 300° F oven for 5 minutes. The resulting coatings all more than passed the cigarette test, permitting no charring of the batting.

Triton X-100 is octyl phenoxy polyethoxy ethanol. Geon 460X1 latex is a vinyl chloride polymer latex while Alcogum AN-10 is a gum thickener.

EXAMPLE 2

The formulations of Example 1 were coated onto cotton ticking at 20-, 30-, and 40-mil knife settings and dried for 10 minutes at 210° F. The results of the cigarette test are given in Table 1.

TABLE 1

Effect of Aluminum Flake Size on Resistance to Burning Cigarette.

| Knife Setting mils | Filler Mesh Size 100 | 325 | 400 |
|---|---|---|---|
| 20 | very slight char | slight char | bad char |
| 30 | no char | no char | slight char |
| 40 | no char | no char | very slight char |

It is apparent from these results that although all three sizes of flake gave considerable protection against the burning cigarette, the 100-mesh flake was, the most effective.

EXAMPLE 3

Five runs identical in most respects to Example 2 were made, the variations being essentially only in amounts of MD 2100 aluminum flake used. (An additional 43g of water was put into the formulation carrying 125g of aluminum). Only MD 2100 was used, the objective of this Example being to show the effect of change of concentration of the filler. Results are shown in Table 2.

TABLE 2

Effect of Aluminum Flake Concentration and Film Thickness on Resistance to Burning Cigarette.

| Al Added g | Test Results at Various Knife Settings (mils) 20 | 30 | 40 |
|---|---|---|---|
| 25 | Charred | Charred | Charred |
| 50 | Charred | Slight charred | Very slightly charred |
| 75 | Slight charred | Very slightly charred | No char |
| 109 | Very slightly charred | No char | No char |
| 125 | Very slightly charred | No char | No char |

These results show that both thickness of coating and concentration of aluminum are important in preventing damage to the batting by the cigarette.

EXAMPLE 4

In this Example the effect of coating with an organosol instead of a latex is demonstrated. Stirring was done with a double-propeller Lightnin' mixer. MD 2100 aluminum flake (100g) was mixed with 80g of tricresyl phosphate, and 50g of Geon 121 vinyl chloride polymer resin was mixed with 40g of xylene, after which these two mixtures were blended at high speed. Another 50g of Geon 121 was added and the mixture was stirred until the container became warm to the touch. The organosol was smooth and very viscous at this point. Ten more grams of tricresyl phosphate and 24g of xylene were slowly added with vigorous stirring. The mixture was then coated at knife settings of 10, 20, 30, and 40 mils onto the back of mattress ticking, after which the specimens were baked in a 370° F oven for 6 minutes. In the cigarette test no charring was produced under the 30- and 40-mil, very slight charring under the 20-mil, and slight charring under the 10-mil coating. The results indicate that the organosol method of coating is an effective alternative to the use of an aqueous system although the latter has the advantage of reduced cost in the vehicle used.

EXAMPLE 5

Exon 790 (202g), 100g of MD 2100 aluminum, 20g of Triton X-100, 50g of tricresyl phosphate, and 5g of Alcogum AN-10 were mixed by the procedure of Example 1. The mixture was knife-coated at settings of 5, 7.5, 10, 15, 20 and 25 mils onto mattress ticking previously treated with a flame retardant, and then dried at 250° F for 5 minutes. Charring occurred in the cigarette test with the 5- and 7.5-mil samples, slight charring with 10-mil, very slight charring with 15-mil, and no charring with 20- and 25-mil coatings. The coatings were somewhat less flexible than coatings of the preceding examples but all were breathable.

Those specimens which passed the test were weighed and found to have coatings, in oz/yd$^2$, of 4.7 (10-mil), 6.7 (15-mil), 8.7 (20-mil), and 10.9 (25-mil).

EXAMPLE 6

A composition prepared as follows and applied in the manner of Example 1 also gives ticking samples which passed the cigarette test:

Ten grams of tricresyl phosphate was mixed with one gram of Triton X-100. In another container 10g of water and 0.44g of X-100 were mixed and then pasted with 10g of MD 2100 aluminum flake. In a third container 20g of Exon 790 and one gram of X-100 were mixed. The Exon 790 mix was then stirred into the aluminum suspension, the tricresyl phosphate was stirred in next, all at high speed with the Lightnin' mixer, and finally 5.75g of Alcogum AN-10 was stirred in at low speed.

Exon 790, as used in this Example and in Example 5, is a highly sensitive latex system and consequently considerable care is required in formulating coating compositions which contain this binder. Stability of the resin/-filler suspension is important and, in Example 6, the success in obtaining a stable suspension was due to dispersal of the wetting agent, Triton X-100, among all of the components of the formulations before they were blended with each other. There is a marked tendency, however, for scale-up formulations containing Exon 790 to show a graininess and suspension separation but this can be avoided by effective mixing of the components.

EXAMPLE 7

Example 6 was repeated with the following modifications:

Mix 1: Stir 4g of Triton X-100 into 11.9g of tricresyl phosphate.

Mix 2: Mix 25g of water and 0.5g of Triton X-100 and then add this to 25.0g of MD 2100 aluminum to form a paste.

Mix 3: Into 68.5g of Geon 576 stir 3.2g Triton X-100 and 13.8g of water.

Mix 4: Stir mix 3 into mix 2.

Mix 5: Stir mix [5] *4* slowly into mix 1 with an electric mixer.

Mix 6: Stir 13.5g of Alcogum AN-10 into mix 5 with the electric mixer.

The same procedure was repeated, but with the total water reduced from 38.8g to 25.0g to form a more concentrated mixture, the pH of which was 9.5. Both of these formulations were coated onto ticking at knife settings of 7, 10 and 15 mils and cured 4 minutes at 300° F. All of the ticking samples passed the cigarette test.

On overnight standing it was noted that the two formulations were foamy. This was obviated by reducing the pH of the mixtures to about 8 thus minimizing action of water on the aluminum flake and resulting evolution of hydrogen.

EXAMPLE 8

Polyethylene glycol di-2-ethylhexoate (Union Carbide's Flexol 4GO) was substituted for tricresyl phosphate as a plasticizer, the procedure being otherwise that used in Example 6. Performance throughout the run was good, and coatings laid down at 7-, 10-, and 15-mil knife settings all passed the cigarette test.

EXAMPLE 9

In this formulation an acrylic latex, Rhoplex HA-8, and a polyacrylic acid [thickness] *thickener* were used as follows:

Mix 1: 100g of MD 2100 aluminum flake and 2g of Triton X-100 were mixed with 70g of water.

Mix 2: 5g of thickener was added to 222g of Rhoplex HA-8 and the pH was adjusted to 8.

Mix 3: Mix 2 was added to mix 1 and stirred until smooth. Resulting mixture was divided into 3 parts.

Mix 4: Ammonia was stirred into the 3 parts of mix 3 to pH 7, 8, and 9, respectively.

The mixtures were spread on ticking at knife settings of 7, 10 and 15 mils and cured 4 minutes at 300° F. All samples passed the cigarette test, add-ons ranging from 2.4–3.9 oz/yd$^2$. The different pH settings produced no perceptible differences in the coating results.

EXAMPLE 10

This formulation used Aircoflex 400 ethylene/vinyl acetate copolymer, a smaller than usual amount of tricresyl phosphate, and Acrysol ASE-60 thickener as follows:

Mix 1: Emulsify 20g of tricresyl phosphate with 5g of Triton X-100.

Mix 2: Paste 100g of MD 2100 aluminum with 141g of water and 3g of Triton X-100.

Mix 3: Stir 5g of Triton X-100 into 184g of the ethylene/vinyl acetate copolymer.

Mix 4: Stir mix 3 into mix 2 by hand.

Mix 5: Stir mix 1 into mix 4 with an electric mixer.

Mix 6: Stir 3g of thickener into mix 5.

The final mixture was thixotropic and coated on less smoothly than usual. The 10- and 15-mil coatings, after drying 4 minutes at 300° F (4.1- and 4.7-oz/yd$^2$), passed the cigarette test; but the 7-mil coating did not. When an otherwise identical mixture (but using half as much Triton X-100, and Alcogum AN-10 in place of Acrysol ASE-60 as thickener) was coated on cloth after adjustment to pH 8 with ammonia, lighter (3.2- and 3.7-oz/yd$^2$) but still as effective coatings at 10- and 15-mil settings were achieved.

EXAMPLE 11

In this experiment the aluminum flake was replaced by conductive Madagascar graphite, No. 3 flake (Asbury Graphite Mills, Inc.) and formulated as follows:

Mix 1: Emulsify 12.5g of tricresyl phosphate with 3g of Triton X-100.

Mix 2: Paste 50g of graphite with 46g of water and 2g of Triton X-100.

Mix 3: Mix 1.5g of Triton X-100 into 92g of Aircoflex 400.

Mix 4: Stir mix 2 into mix 3 by hand.

Mix 5: Stir mix 1 into mix 4 with an electric mixer.

Mix 6: Stir 8g of Alcogum AN-10 into mix 5.

At 7-, 10-, and 15-mil knife settings, with 4-minute drying at 300° F, coatings [,] of 2.5, 3.4 and 3.9 oz/yd$^2$ were obtained. All three of these passed the cigarette test.

EXAMPLE 12

The proportions of Example 10 were changed by using 20g of tricresyl phosphate, 73.4g of graphite, 20g of water, and 8g of Alcogum AN-10. Somewhat higher add-ons were achieved because of the lesser amount of water used, the dried coatings being 4.6, 5,6, and 7.7 oz/yd$^2$ at 7-, 10-, and 15-mil settings. All passed the cigarette test.

EXAMPLE 13

In this experiment two mixtures combining graphite and aluminum in different proportions, each mixture totalling 50g of filler, were used effectively. Proportions and procedures were those of Example 10 except for the use of 12g of Alcogum AN-10 instead of 8g and, in one case, 45g of Asbury No. 3 graphite and 5g of MD 2100 aluminum, and in the other, 37.5g of graphite and 12.5g of aluminum. Add-ons at 7, 10, and 15 mils were 2,5, 3.7, and 4.8 oz/yd$^2$ in the first case, and 2.8, 4.0, and 5.1 oz/yd$^2$ in the other. Although all six specimens passed the cigarette test, those with the greater amount of aluminum gave the least amount of batting scorch.

EXAMPLE 14

In a large-scale run with MD 2100 aluminum, the following procedure was used:

Mix 1: Stirred 40 lbs. MD 2100 aluminum, 26.9 lbs. water, and 0.82 lbs. (372g) Triton X-100 together by hand.

Mix 2: Stirred 73.5 lbs. Geon 576 and 3.28 lbs. of Triton X-100 together by hand.

Mix 3: Stirred 12.7 lbs. tricresyl phosphate and 4.1 lbs. Triton X-100 together with an electric mixer.

Mix 4: Stirred mix 2 into mix 1 by hand.

Mix 5: Put mix 4 under the Cowles mixer and stirred mix 3 into it.

Mix 6: Stirred acetic acid (ca. 200 ml) into mix 5 to pH 8.0–8.5.

Mix 7: Thickened with 7.8 lbs. Alcogum AN-10. Viscosity was 13,600 cps on Model RVT Brookfield viscometer, spindle No. 7 at 10 rpm.

The mixture was coated onto 54-inch plain mattress ticking at a 5-mil knife setting at 16 yards/min. and passed through a 330° F oven. In the absence of a tenter frame the fabric lost about 2 inches in width. The average add-on was 2.8 oz/yd$^2$. The coated fabric passed the cigarette test.

EXAMPLE 15

A similar large-scale run with the No. 3 Madagascar graphite flake of Example 10 followed this procedure:

Mix 1: Stirred 49 lbs. of graphite, 25.4 lbs. of water, and 1.3 lbs. of Triton X-100 together by hand.

Mix 2: Stirred 0.8 lb. of Triton X-100 into 60.2 lbs. of Aircoflex 400 by hand.

Mix 3: Stirred 2.2 lbs. of Triton X-100 into 11.4 lbs. of tricresyl phosphate with an electric mixer.

Mix 4: Stirred mix 2 into mix 1 by hand.

Mix 5: Stirred mix 4 with an electric mixer while adding mix 3.

Mix 6: Stirred mix 5 with the electric mixer while adding 7.0 lbs. Alcogum AN-10. Viscosity was 18,800 cps Brookfield, using Spindle No. 7 at 10 rpm.

The mixture was coated onto 54-inch plain mattress ticking at a 5-mil knife setting at 14 yds/min and passed through a 325° F oven. Loss in fabric width was about 1-¾ inches. The average add-on was 3.9 oz/yd$^2$. This fabric too passed the cigarette test.

EXAMPLE 16

The effectiveness and permanency of cigarette-resistant coatings on fabrics where launderability is important, such as those to be made into mattress pads and mattress covers, was demonstrated in the following example. The aluminum coating formulation of Example 14 was knife-coated at the 3.9-oz/yd$^2$ level onto 100% cotton sheeting (preshrunk), 50/50 polyester/cotton sheeting, and 1.2-oz spunlaced fabric, followed by drying for four minutes at 265° F. The appearance of the top (uncoated) surface of the 100% cotton fabric was virtually unaffected by the coating. Pronounced but not unreasonable grayness was evident in the other lighter-weight fabrics. Each of these coated fabrics passed the cigarette test. One-foot squares of each were cut out, laundered five times in a Kenmore home washer, using warm water and detergent, and pressed. Except for loss of original glossiness, the coatings were unaffected by the washing. Each passed the cigarette test again and showed no evidence of puckering or other distortion of the fabric.

Similarly applied 2.5-oz/yd$^2$ aluminum-filled coatings on 100% cotton sheeting and 1.2-oz spunlaced fabric also passed the cigarette test and were resistant to laundering. This level of application looked, however, to be borderline in its cigarette resistance.

Similar application of the graphite formulation of Example 15 to the sheeting materials at the 3.9-oz/yd$^2$ level gave cigarette- and laundry-resistant fabrics whose only apparent fault was a lower dry-crocking rating.

The above-noted spunlaced fabric consists of fibers entangled in a predetermined, repeating pattern to form a strong unbonded nonwoven structure having a tensile strength greater than one pound per inch per ounce per square yard. Spunlaced nonwovens are described in U.S. Pat. Nos. 3,434,188, 3,485,706, 3,485,708, 3,485,709, 3,486,168, 3,493,462, 3,494,821, 3,498,874, and 3,508,308, the disclosures of which are hereby incorporated by reference to the extent necessary to understand the definition and characteristics of these nonwoven products.

These coated sheeting fabrics were found to be particularly suitable for conversion to mattress pads and mattress covers. Quilted pads are precoated on the inner sides of preferably both faces, although even a pad coated on only one face will afford, whenever the pad is turned over in use, a high degree of protection to the mattress beneath it. Contoured mattress covers, which normally cover only one surface and the edges of the mattress, may most suitably be made with only their flat surface inner-coated, leaving the vertically oriented and generally elasticized edges free to serve their form-fitting purpose. Wrap-around covers may of course be coated either over their entire inner surfaces or, if desired, only on their two horizontal areas.

While the invention has been described above in connection with the treatment of mattress fabrics, it will be appreciated that other types of fabrics, where fire-resistance is desired, may be similarly processed. Thus, for example, the invention may be used with pillow covers or slips and various kinds of upholstery, e.g., automotive and home furnishing types. The invention is not to be construed, therefore, as limited to the treatment of mattress fabrics although this is a particularly unique and advantageous application of the invention.

It will be recognized that various other modifications may be made in the invention as described and exemplified herein. Hence the scope of the invention is defined in the following claims wherein:

What is claimed is:

1. A fire retardant textile product comprising a mattress batting assembly which is normally susceptible to burning by a cigarette and a fire retardant fabric positioned on said batting assembly to retard burning thereof, said fabric having a heat conductive coating on its underside adjacent to and in contact with said assembly, said coating comprising a flexible, film-forming polymeric binder having dispersed therein from 30–60% by weight of a flake- or leaf-shaped heat conductive material selected from the group consisting of aluminum and graphite of from 50–400 mesh, the weight of the coating being at least about 2 ounces per square yard of fabric and the amount and size of said heat conductive material and the thickness of said coating being sufficient to carry away the heat of a cigarette falling or placed on the topside of said fabric so as to avoid burning or substantial charring of said assembly.

2. A fire retardant textile product as claimed in claim 1 wherein the fabric is mattress ticking and the assembly is mattress batting.

3. A fire retardant textile product according to claim 1 wherein the fabric is a mattress pad or cover and the assembly is a mattress.

4. The textile product of claim 1 wherein the coating comprises about 100-mesh aluminum filler in a vinyl binder, the dried coating weighing about 2–7 ounces per square yard of fabric and containing about 45% by weight aluminum.

5. The textile product of claim 1 wherein the coating comprises conductive graphite in a vinyl binder, the dried coating weighing from 4–4.5 ounces per square yard of fabric.

6. The textile product of claim 1 wherein the heat conductive material is a mixture of aluminum and graphite.

7. The textile product of claim 1 wherein the binder is a film-forming addition polymer of one or more ethylenically unsaturated monomers such as a vinyl polymer or an acrylic polymer, or a flexible polyurethane.

8. The textile of claim 7 wherein the binder is a member selected from the group consisting of polyvinyl chloride copolymer, polyvinyl chloride homopolymer, ethylene-vinyl acetate copolymer, and self-crosslinking acrylic polymer.

*9. A fire retardant textile product comprising an upholstery batting assembly which is normally susceptible to burning by a cigarette and a fire retardant fabric positioned on said batting assembly to retard burning thereof, said fabric having a heat conductive coating on its underside adjacent to and in contact with said assembly, said coating comprising a flexible, film-forming polymeric binder having dispersed therein from 30–60% by weight of a flake- or leaf-shaped heat conductive material selected from the group consisting of aluminum and graphite of from 50–400 mesh, the weight of the coating being at least about 2 ounces per square yard of fabric and the amount and size of said heat conductive material and the thickness of said coating being sufficient to carry away the heat of a cigarette falling or placed on the topside of said fabric so as to avoid burning or substantial charring of said assembly.*

*10. The textile product of claim 9 wherein the coating comprises about 100-mesh aluminum filler in a vinyl binder, the dried coating weighing about 2–7 ounces per square yard of fabric and containing about 45% by weight aluminum.*

*11. The textile product of claim 9 wherein the coating comprises conductive graphite in a vinyl binder, the dried coating weighing from 4–4.5 ounces per square yard of fabric.*

*12. The textile product of claim 9 wherein the heat conductive material is a mixture of aluminum and graphite.*

*13. The textile product of claim 9 wherein the binder is a film-forming addition polymer of one or more ethylenically unsaturated monomers such as a vinyl polymer or an acrylic polymer, or a flexible ployurethane.*

*14. The textile of claim 9 wherein the binder is a member selected from the group consisting of polyvinyl chloride copolymer, polyvinyl chloride homopolymer, ethylene-vinyl acetate copolymer, and self-crosslinking acrylic polymer.*

* * * * *